United States Patent [19]

Pattanayak

[11] Patent Number: 5,748,564
[45] Date of Patent: May 5, 1998

[54] AMPLIFIED ACOUSTO-OPTICAL VIBRATION SENSOR AND ULTRASONIC TRANSDUCER ARRAY

[75] Inventor: Deva Narayan Pattanayak, Niskayuna, N.Y.

[73] Assignee: General Electric Company, Schenectady, N.Y.

[21] Appl. No.: 831,585

[22] Filed: Apr. 9, 1997

[51] Int. Cl.$^6$ .............................. H04R 23/00; G01B 11/02
[52] U.S. Cl. ........................ 367/149; 356/356; 356/358; 73/657
[58] Field of Search .................. 367/149; 73/657; 356/358, 356

[56] References Cited

U.S. PATENT DOCUMENTS

| | | | |
|---|---|---|---|
| 4,243,323 | 1/1981 | Breckinridge | 356/345 |
| 4,548,502 | 10/1985 | Chandra et al. | 356/358 |
| 5,249,032 | 9/1993 | Matsui et al. | 356/356 |
| 5,497,233 | 3/1996 | Meyer | 356/345 |
| 5,572,323 | 11/1996 | Maeda et al. | 356/356 |

OTHER PUBLICATIONS

Jean–Pierre Monchalin, IEEE Transactions on Ultrasonics, Ferroelectrics, and Frequency Control, vol. UFFC–33, No. 5, Sep. 1986.

*Primary Examiner*—J. Woodrow Eldred
*Attorney, Agent, or Firm*—Marvin Snyder; Douglas E. Stoner

[57] ABSTRACT

An acousto-optical vibration sensor, particularly for use in ultrasonic array transducers, such as for medical ultrasound, employs interferometric techniques. A receiver element has a light input port which receives laser light that exits via an output port only after undergoing a multitude of reflections between a static reflecting surface and a vibrating reflecting surface in a manner that enhances frequency-shifted light wave components. The receiver element includes a volumetric region including a layer of material which is both light transmissive and light scattering. In principle, ultrasonically shifted light wave components are enhanced by about six orders of magnitude, and vibration amplitudes significantly smaller than 0.01 A may be detected. Loss resulting from multiple reflections is compensated for by employing active lasing particles, sized so that lasing is induced by the frequency-shifted light.

24 Claims, 3 Drawing Sheets

|   | R | R | R | R | R | R | R |
|---|---|---|---|---|---|---|---|
| T | R | T | R | T | R | T |
|   | R | R | R | R | R | R | R |
| T | R | T | R | T | R | T |
|   | R | R | R | R | R | R | R |
| T | R | T | R | T | R | T |
|   | R | R | R | R | R | R | R |
| T | R | T | R | T | R | T |

*fig. 3*

AMPLIFIED ACOUSTO-OPTICAL VIBRATION SENSOR AND ULTRASONIC TRANSDUCER ARRAY

BACKGROUND OF THE INVENTION

This invention relates generally to array ultrasonic transducers and, more particularly, to an amplified acousto-optical vibration sensor for use in such arrays, and arrays incorporating such sensor.

Ultrasonic array transducers, used for example in medical applications, rely on wave interference for their beam forming effects, and typically include a plurality of individual transducer elements organized as either a one-dimensional (linear) array or a two-dimensional array. Ultrasound is used as a non-invasive technique for obtaining image information about the structure of an object which is hidden from view, and is widely known as a medical diagnostic tool as well as a tool for non-destructive testing and analysis in the technical arts. Medical ultrasonic transducer arrays typically operate at a frequency within the range of one Mhz to ten Mhz, although higher frequencies are certainly possible.

A two dimensional phased array of ultrasonic transducer elements is often designed to obtain image data in two dimensions, without requiring movement of the array transducer.

Conventional transducer arrays employ piezoelectric elements. In two-dimensional ultrasound transducer arrays, the size of an individual transducer element is quite small, compared to that in one-dimensional arrays, with an attendant increase in density of electrical connections required; however, the sizes of most other components (e.g. coaxial cables and associated electronics) have not been reduced. Therefore, providing electrical connections in this dense environment becomes a significant problem.

One prior art approach to this problem is disclosed in Smith et al U.S. Pat. No. 5,091,893, entitled "Ultrasonic Array with a High Density of Electrical Connections" issued Feb. 25, 1992, and assigned to the present assignee. The Smith et al. patent discloses a piezoelectric ultrasonic array transducer having its individual elements connected to external electronics via a high density interconnect structure fabricated employing HDI techniques.

Another problem related to reduced size of piezoelectric elements is an increase in electrical impedance of the individual elements, causing difficulty in impedance matching to coaxial cables and preamplifier electronics, and attendant loss in sensitivity. One approach in the design of conventional piezoelectric elements is to employ a multilayer piezoceramic in order to decrease the electrical impedance of each element which, in the receive mode, enables the element to more effectively drive the coaxial cable and preamplifier electronics.

While piezoelectric elements are advantageous in that the same element can function both as a transmitter and a receiver, since receiver sensitivity is a fundamental limitation, consideration may be given to the use of other types of vibration sensor.

Relevant in the context of the subject invention are optical vibration sensors based on interferometric techniques. For example, see J. Monchalin, "Optical Detection of Ultrasound," IEEE Transactions on Ultrasonics, Ferroelectrics, and Frequency Control, Vol. UFFC-33, p. 485 (1986). Very briefly, when monochromatic light (i.e. laser light) of a given frequency is incident upon a reflective surface set into motion by an acoustic wave, the light reflected from the surface is shifted in frequency by a Doppler shift. Measurement of the frequency shift enables the amplitude of vibration to be determined.

As an example, if laser light defined as $E \cos(\omega t)$ is incident upon a vibrating surface whose motion is described by the function $\delta(t) = U \cos(2\pi f\, t + \psi)$, where U is the amplitude of the surface motion, then the reflected light wave can be described as $E[\cos(\omega t) + 2\pi U\{\sin(2\pi(v+f)t+\psi) + \sin(2\pi(v-f)t+\psi)\}]$, where E denotes amplitude of the laser light, $\omega$ its angular frequency, $v$ its frequency, $f$ the frequency of the sound wave, and $\psi$ the phase of the sound wave. Thus, by measuring the frequency spectrum of the reflected light, one can determine the amplitude U of the surface motion, since the ratio of the amplitude of the Doppler-shifted light to the amplitude of the unshifted light is related to the amplitude of the surface motion, U.

Optical vibration sensors based on interferometric techniques can measure vibration amplitudes of the order of 0.01 Å. However, in medical ultrasound applications, vibrations resulting from reflections by tissue inhomogeneities are many orders of magnitude lower than 0.01 Å.

SUMMARY OF THE INVENTION

According to one aspect of the invention, an acousto-optical vibration sensor suitable for use as a receiver element in an array ultrasonic transducer, particularly for use in medical applications, alleviates problems attendant to dense cabling in conventional ultrasonic transducer applications by avoiding need for a high density of electrical connections and need for receiving element preamplifiers, while also alleviating cable loading effects inevitable in small element piezoelectric receive elements. The transducer is an acousto-optical vibration sensor that employs interferometric techniques in which frequency-shifted light components are enhanced so that vibration amplitudes significantly smaller than 0.011 Å may be detected. The acousto-optical receiver element is designed so that light escapes from the element only after undergoing a multitude of reflections between a static reflecting surface and a vibrating reflecting surface, such that frequency-shifted optical signal components are enhanced considerably. Ultrasonically frequency-shifted light wave components may be enhanced in principle by about six orders of magnitude, compared to conventional optical vibration sensors based on interferometric techniques as disclosed in the J. Monchalin literature reference, above.

More particularly, an acousto-optical receiver element of the invention includes a volumetric region bounded by a planar sensing surface on one side, and by a planar opposite surface, both surfaces being reflective to light internally. The volumetric region includes a damping volumetric region comprising a layer of optically transparent acoustically damping material is bounded by the sensing surface on one side and by a damping layer optical interface surface on the other side. The volumetric region also includes a scattering volumetric region comprising a layer of material which is both light scattering and light transmissive. The scattering region is bounded on one side by a scattering layer optical interface surface defining an optical interface with a damping layer optical interface surface, and on the other side by the planar opposite surface. Thus the sensing surface can vibrate in response to incident acoustic waves, while at the same time the opposite surface is acoustically isolated from the sensing surface.

By way of example, the layer of optically transparent acoustically damping material may comprise soft polyethylene with an acoustic impedance close to that of a body under investigation. Thus, in the case of medical ultrasound applications, the optically transparent acoustically damping material has an acoustic impedance close to matching that of human flesh.

The layer of light scattering and light transmissive material may comprise an emulsion of light transparent material spheres in a suitable matrix, such as polystyrene spheres having a diameter of 0.2 to 0.5 micron in a polyethylene matrix.

Also provided is a light input port, for example including a prism, for introducing monochromatic light through the opposite surface into the volumetric region and, more particularly, into the scattering region where multiple internal reflections between the sensing surface and reflective portions of the opposite surface occur. A light output port, spaced from the light input port, receives light from the volumetric region and, more particularity, from the scattering region, through the opposite surface after multiple internal reflections. The light output port likewise comprises a prism.

The acousto-optical receiver elements of the invention may be employed in an acoustical vibration sensing system which includes, in addition to the acousto-optical receiver element, a monochromatic light source, such as a laser, an interferometric device for determining the difference frequency between two light signals, an optical path from the laser light source to the light input port, an optical path from the laser light surface to the interferometric device, and an optical path from the light output port to the interferometric device.

In accordance with another aspect of the invention, a two-dimensional ultrasonic transducer array is provided including a plurality of conventional piezoelectric transducer elements employed as transmitters, and a plurality of acousto-optical receiver elements fabricated in accordance with the invention. The transmitter elements are surrounded by receiver elements.

BRIEF DESCRIPTION OF THE DRAWINGS

FIG. 3 depicts a two-dimensional ultrasonic transducer array including conventional piezoelectric transducer elements employed as transmitters surrounded by acousto-optical receiver elements of the invention.

DETAILED DESCRIPTION

Figure 1:
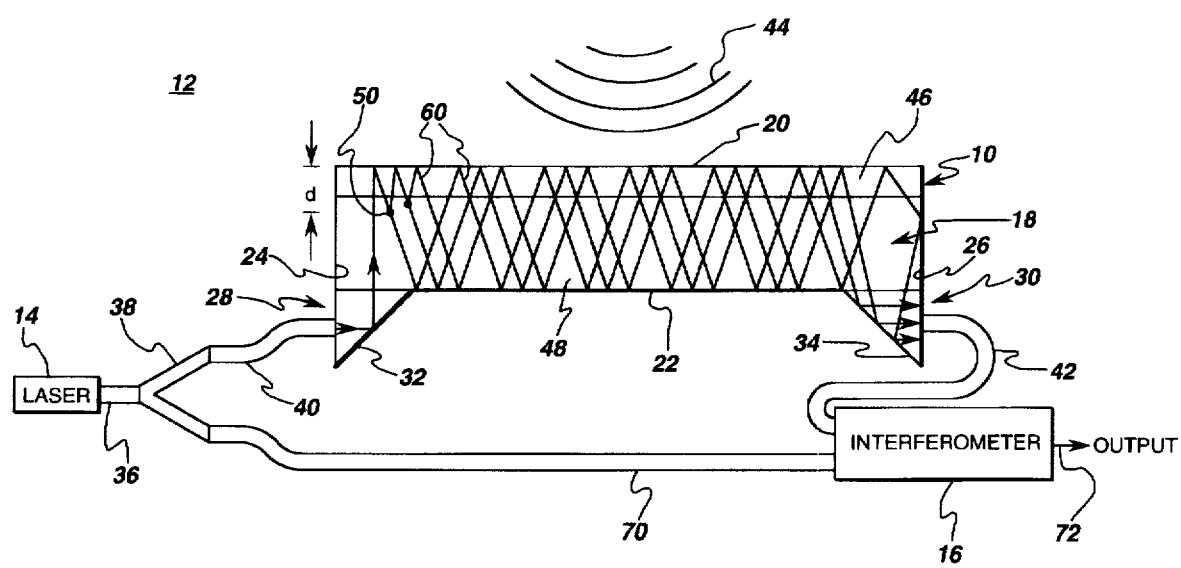
FIG. 1 is a highly schematic representation of an acousto-optical receiver element of the invention employed in an acoustical vibration sensing system.

FIG. 1 illustrates an acousto-optical receiver element 10 incorporated within an acoustical vibration sensing system 12 which includes a monochromatic light source in the form of a laser 14, and an optical interferometer 16.

Receiver element 10 includes a volumetric region 18 bounded by a planar internally reflecting sensing surface 20 on one side, a planar opposite surface 22, and end surfaces 24 and 26. Opposite surface 22 is mirrored, except for a light input port 26 and a light output port 28, as are end surfaces 24 and 26, so that light can enter and exit receiver element 10 only at controlled points, namely light input port 28 and a light output port 30.

Light input port 28 and light output port 30 include respective right angle microprisms 32 and 34. Light enters microprism 32 of input port 28 from laser 14 via an optical fiber 36, a beam splitter 38 and an optical fiber 40, and exits microprism 34 of output port 30 via an optical fiber 42.

Dimensions of receiver element 10 are based on the sound wavelength $\lambda s$ at the ultrasonic operating frequency. Typical dimensions are $\lambda_s/2 \times \lambda_s/2 \times 10$ to 50 microns in length. The relative thickness of a damping region 46 and a scattering region 48 can vary from about 1:3 to 1:5, depending upon the materials used in these regions.

During operation, ultrasonic waves 44, incident upon sensing surface 20, cause oscillating physical movement of surface 20, the amplitude of which may be significantly smaller than 0.01 Å. Typically, sensing surface 20 is pressed directly against a surface of a body under investigation, such as the skin of a human body, so that ultrasound waves 44 do not travel in air.

Volumetric region 18 between surfaces 20 and 22 comprises a damping volumetric region 46 fabricated of material whose acoustic impedance is preferably close to that of the body under investigation, and a scattering volumetric region 48 comprising a layer of material that is both highly light scattering and light transmissive.

The material of damping volumetric region 46 is both optically transparent and acoustically damping and may comprise, for example, soft polyethylene.

Scattering volumetric region 48 may comprise, for example, an emulsion of dielectric spheres in a suitable matrix, such as polystyrene spheres having a diameter of 0.2 to 0.5 micron in a polyethylene matrix. These dielectric spheres define a multiplicity of scattering inclusions 50, only two of which are shown for purposes of illustration.

Laser light travels from input port 28 to output port 30 via multiple paths 60 which encounter scattering inclusions 50 and are internally reflected by vibrating sensing surface 20 many times. This enables detection and measurement of very low amplitude sound waves because the light is reflected many times between a static region defined by scattering volumetric region 48 and reflecting surface 22 (the only roles of which are to reflect and scatter light), and the vibrating sensing surface 20. It will be appreciated that damping volumetric region 46 isolates movements of sensing surface 20 from the remainder of the device structure. Accordingly, acoustic isolation between sensing surface 20 and bottom surface 22 and scatter multiplication between sensing 20 and opposite 22 surfaces increase the amplitude of frequency shift due to vibration by a factor of the number of multiple scatterings between the sensing 20 and opposite 22 surfaces.

The separate damping region 46 can in some cases be eliminated, as the light vibrations travel fast ($3 \times 10^8$ m/sec) compared to ultrasound vibrations (1500 m/sec). Accordingly, top and bottom surfaces 20 and 22 can be considered to be decoupled insofar as light rays are concerned.

In the highly schematic representation of FIG. 1, the two representative scattering inclusions 50 result in one primary ray splitting into three rays. Multiple scattering generates multiple rays, and each ray encountering vibrating surface 20 generates a ray shifted by the ultrasound frequency.

As an example, once-reflected laser light wave, $E[\cos(\omega t) + 2\pi U\{\sin(2\pi(v+f)t+\psi) + \sin(2\pi(v-f)t+\psi)\}]$, upon one subsequent reflection, becomes $E[\cos(\omega t) + 4\pi U\{\sin(2\pi(v+f)t+\psi) + \sin(2\pi(v-f)t+\psi)\}]$, and so on. After a large number of reflections, the amplitude of the frequency-shifted components increases almost linearly as the repeated number of reflections, until appreciable source depletion occurs.

The loss resulting from multiple successive reflections can be compensated for by employing within damping volumetric region 46 or scattering volumetric region 48, or both, an active material comprising active lasing particles, which amplify the optical signal. Each active lasing particle comprises a resonant cavity that is required for lasing. Multiple reflections within an active lasing particle occur within the resonant cavity. The active lasing particles can be spheres made of sapphire ($Al_2O_3$) with a chromium oxide ($Cr_2O_3$) dopant of the order of 0.05% by volume. By appropriate selection of the size of the active lasing spheres, lasing is induced only by the frequency-shifted light. See H.M. Tzeng, K.F. Wall, M.B. Long and B.K. Chang, "Laser emission from individual droplets at wavelength corresponding to morphology dependent resonances," Optics Letters, Vol. 9, pages 499–501 (1984).

Since light requires only one picosecond to cover a distance of 0.3 mm in a non-scattering medium, in a highly scattered medium a million multiple encounters are possible within one microsecond, which is a typical time period for the duration of an acoustical pulse. Thus, in principle, by proper design of the scattering layers (with suitable particle size and distribution), about six orders of magnitude enhancement of the amplitudes of the ultrasonically frequently-shifted light wave can be obtained.

Considering the overall system 12 of FIG. 1, optical interferometer 16 has, as inputs, a light signal along optical fiber 42 from output port 30, as well as an optical signal from laser 14 via beam splitter 36 and an optical fiber 70. An output 72 is provided on interferometer 16.

The optical signal at output port 30 includes a multiple components which have taken different paths 60 through receiver element 10, and some of these optical signal components are frequency shifted. Of interest are those components which have undergone multiple reflections by vibrating sensing surface 20.

Since the ultrasound frequency of interest is in the 10 Mhz range ($10^7$ Hz) and the light frequency of interest is in the $10^{14}$ Hz range, vibrating sensing surface 20 can be considered to be static for about one microsecond (1 µs). Thus the variation of an optical pulse is of the order of $$\Delta t \sim \frac{1}{\Delta f} \sim 10^{-14} \text{ sec.}$$

During this time, vibrating surface 20 moves very little, a typical ultrasonic vibration frequency being 10 Mhz. Also during this time, the number of possible reflections N can be expressed as $$N = \frac{1 \, \mu s}{\frac{2d}{c}},$$

where d is the distance between representative scattering inclusion 50 and vibrating sensing surface 20, and c is the speed of light. As an example, assuming d=1500 nm and c=$3 \times 10^8$ m/sec, then N=$1 \times 10^8$. This is indeed a large number of reflections, compared to a Fabry Perot resonant cavity having dimensions in the order of a millimeter.

Figure 2:
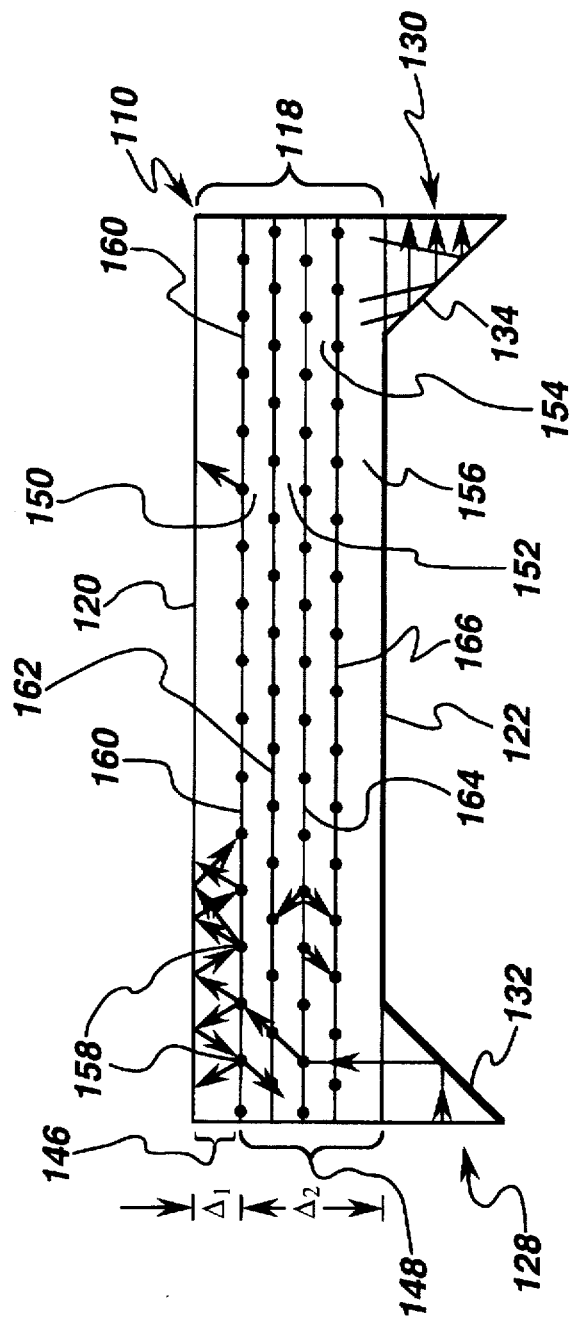
FIG. 2 is a representation of an alternative acousto-optical receiver element with additional light scattering layers to enhance the number of light reflections.

FIG. 2 depicts an alternative receiver element 110 also including a volumetric region 118 between a planar internally reflecting sensing surface 120 on one side and a mirrored opposite surface 122. As in the case of receiver element 10 of FIG. 1, light input port 128 and light output port 130 include respective right angle microprisms 132 and 134. Likewise, volumetric region 118 comprises a damping volumetric region 146 of thickness $\Delta_1$ and a scattering volumetric region 148 of thickness $\Delta_2$. $\Delta_1$ is of the order of 500 mm. $\Delta_2$ is of the order of 10 to 50 microns.

To enhance the number of light reflections or bounces from vibrating sensing surface 120, scattering volumetric region 148 comprises an inhomogeneous layered structure, including representative thin (e.g. of the order of 500 nm) layers 150, 152, 154, 156 of transparent dielectric such as polyethylene, with scattering particles 158 randomly dispersed at thin layer interfaces 160, 162, 164, 166. Scattering particles 158 have diameters of the order of 100 to 200 mm, and are comprised of a higher dielectric constant material such as sapphire. This structure breaks the primary ray into a multitude of scattered rays, shown schematically in FIG. 2.

The output signal from output port 130 includes background signals of various path lengths and coherent frequencies. With appropriate time gating and by applying coherent signal detection techniques, these components can be separated, since the shifted frequency of interest is known to be ($f_{light} + f_{ultrasound}$).

Acousto-optical receiver element 10 of FIG. 1 (or 110 of FIG. 2) can be employed in conjunction with transmitter arrays in a variety of configurations. One such configuration is depicted in FIG. 3, in which there are three receiver elements R (each corresponding to one of the FIG. 1 receiver elements 10, for example) for each transmitter element T. Receiver elements R may be viewed as acoustically damped regions which thus provide acoustic isolation between the transmitter elements T. If necessary, isolation slots (not shown) between transmitter elements T and receiver elements R can be provided.

Transmitter elements T are conventional piezoelectric elements driven by electrical conductors. Each transmitter element is surrounded by respective ones of receiver elements R. The receiver elements R are connected by optical fibers, such as optical fibers 40 and 42 in FIG. 1. Preamplifiers for receiver elements R are not required, alleviating the cable loading effects usual in small element piezoelectric receiver elements.

While specific embodiments of the invention have been illustrated and described herein, it is realized that numerous modifications or changes will occur to those skilled in the art. It is therefore to be understood that the appended claims are intended to cover all such modifications and changes as fall within the true spirit and scope of the invention.

What is claimed is:

1. An acousto-optical receiver element comprising:

a damping volumetric region comprising a layer of optically transparent acoustically damping material, said damping region bounded by a sensing surface on one side of said damping material layer, and by a damping layer optical interface surface on the opposite side of said damping material layer;

a scattering volumetric region comprising a material that is light scattering and light transmissive, said scattering volumetric region bounded by a scattering layer surface on one side of said scattering material layer contacting and defining an optical interface with said damping layer optical interface surface, and by an opposite surface defining the opposite side of said scattering material layer, at least portions of said opposite surface being internally light reflecting;

a light input port for introducing monochromatic light through said opposite surface into said scattering region for multiple internal reflections between said sensing surface and reflecting portions of said opposite surface; and a light output port spaced from said light input port for receiving light from said scattering region through said opposite surface after said multiple internal reflections.

2. The receiver element of claim 1, wherein each of said light input port and said light output port comprises an optically transparent prism, respectively.

3. The receiver element of claim 1, wherein said layer of optically transparent acoustically damping material has an acoustic impedance substantially matched to that of a body to be examined.

4. The receiver element of claim 1, wherein said layer of optically transparent acoustically damping material comprises soft polyethylene.

5. The receiver element of claim 1, wherein said scattering volumetric region comprises spheres of dielectric material.

6. The receiver element of claim 5, wherein said spheres of dielectric material comprise polystyrene spheres.

7. The receiver element of claim 5, wherein said spheres of dielectric material have a diameter within the approximate range of from 0.2 to 0.5 micron.

8. The receiver element of claim 1, wherein said scattering volumetric region comprises an inhomogeneous layered structure including layers of transparent dielectric material with scattering particles randomly dispersed at interfaces between said layers of transparent dielectric material.

9. The receiver element of claim 1, wherein at least one of said damping volumetric region and said scattering volumetric region comprises active lasing particles.

10. An acousto-optical receiver element comprising:

an optically transparent volumetric region bounded by a planar sensing surface on one side and by a planar opposite surface, at least portions of said opposite surface being internally light reflecting;

a quantity of optically transparent acoustically damping material within said optically transparent volumetric region extending to said sensing surface such that said opposite surface is acoustically isolated from said sensing surface;

a light input port for introducing monochromatic light through said opposite surface into said scattering region for multiple internal reflections between said sensing surface and reflecting portions of said opposite surface; and a light output port spaced from said light input port for receiving light from said volumetric region through said opposite surface after said multiple internal reflections.

11. The receiver element of claim 10, wherein each said light input port and said light output port comprises an optically transparent prism, respectively.

12. The receiver element of claim 10, wherein said optically transparent acoustically damping material has an acoustic impedance substantially matched to that of a body to be examined.

13. The receiver element of claim 10, wherein said optically transparent acoustically damping material comprises soft polyethylene.

14. The receiver element of claim 10, wherein said damping material comprises soft polyethylene.

15. The receiver element of claim 10, wherein said optically transparent volumetric region comprises active lasing particles.

16. An acousto-optical receiver element comprising:

an optically transparent volumetric region bounded by a planar sensing surface on one side and by a planar opposite surface, at least portions of said opposite surface being internally light reflecting;

a scattering volumetric region within said optically transparent volumetric region comprising a material that is light scattering and light transmissive;

a light input port for introducing monochromatic light through said opposite surface into said scattering region for multiple internal reflections between said sensing surface and reflecting portions of said opposite surface; and a light output port spaced from said light input port for receiving light from said scattering region through said opposite surface after said multiple internal reflections.

17. The receiver element of claim 16, wherein each of said light input port and said light output port comprises an optically transparent prism, respectively.

18. The receiver element of claim 16, wherein said scattering volumetric region comprises spheres of dielectric material.

19. The receiver element of claim 18, wherein said spheres of dielectric material comprise polystyrene spheres.

20. The receiver element of claim 18, wherein said spheres of dielectric material have a diameter within the approximate range of from 0.2 to 0.5 micron.

21. The receiver element of claim 16, wherein said scattering volumetric region comprises an inhomogeneous layered structure including layers of transparent dielectric material with scattering particles randomly dispersed at interfaces between said layers of transparent dielectric material.

22. The receiver element of claim 16, wherein said scattering volumetric region comprises active lasing particles.

23. An acoustical vibration sensing system comprising:

an acousto-optical receiver element including:

an optically transparent volumetric region bounded by a planar sensing surface on one side and by a planar opposite surface, at least portions of said opposite surface being internally light reflecting, a scattering volumetric region within said optically transparent volumetric region comprising a material that is light scattering and light transmissive, a light input port for introducing monochromatic light through said opposite surface into said scattering region for multiple internal reflections between said sensing surface and reflecting portions of said opposite surface, and a light output port spaced from said light input port for receiving light from said scattering region through said opposite surface after multiple internal reflections;

a monochromatic light source;

a device for determining the difference frequency between two light signals;

an optical path from said monochromatic light source to said light input port;

an optical path from said monochromatic light source to said device; and an optical path from said light output port to said device.

24. A two-dimensional ultrasonic transducer array comprising a plurality of acousto-optical receiver elements of the type set forth in claim 16, and further comprising:

a plurality of piezoelectric transducer transmitter elements, said transmitter elements and said receiver elements being arranged such that said transmitter elements are each surrounded by respective ones of said receiver elements.

* * * * *